April 30, 1935.   P. KRAFT ET AL   1,999,240
DARK FIELD CONDENSER FOR MICROSCOPES
Filed Sept. 16, 1933
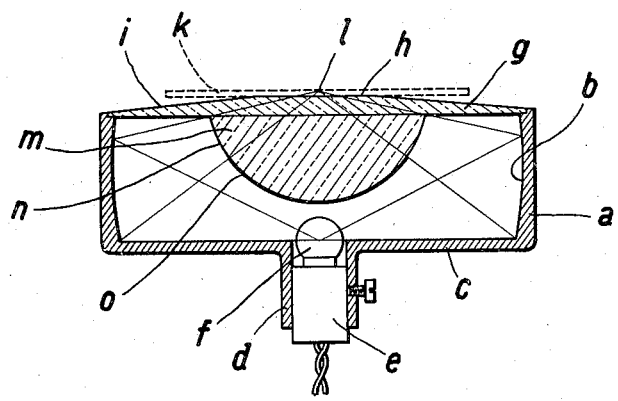
Inventors:
Paul Kraft.
Rudolf Strauba Patented Apr. 30, 1935

1,999,240

UNITED STATES PATENT OFFICE 1,999,240

DARK-FIELD CONDENSER FOR MICROSCOPES

Paul Kraft and Rudolf Straubel, Jena, Germany, assignors to firm Carl Zeiss, Jena, Germany Application September 16, 1933, Serial No. 689,750
In Germany September 19, 1932

2 Claims. (Cl. 88—40)

We have filed an application in Germany, September 19, 1932.

The invention concerns a dark-field condenser for microscopes, namely a dark-field condenser of the kind in which use is made of a reflecting surface of metal, that is to say of the interior surface of a metal ring, and it consists in this that the object is supported by a transparent plate lying against the ring. This plate, which may be of glass or any other suitable material, for instance quartz, not only provides an object support but also protects the object from the heat rays emitted by the source of light.

As the pencil of rays emanating from the condenser naturally has a comparatively great apertural angle, it is necessary to provide an immersion liquid between the object support and the object carrier. When all of one surface of the object carrier lies on the object support, it is very often difficult to raise the carrier from the said support, and this difficulty is increased by the immersion liquid. It is therefore advantageous to give the said surface of the object carrier the form of the frustum of a cone or to make it represent a spherical zone, the consequence being that the area of the plane supporting surface is reduced and that the ends of the object carrier lie free, and to provide the immersion liquid only on the said frustum surface, which is the only part of the plate that is traversed by the rays.

The plate is conveniently provided with a plano-convex lens whose convex part is a spherical surface having at its centre the point at which the light rays are converged. All reflected rays enter this lens without being refracted, and the desired convergence of the rays at one point in the object is not disturbed by any refraction by the plate.

The accompanying drawing represents a constructional example of the invention in a central section in elevation.

The constructional example has an annular reflecting body $a$ the interior surface $b$ of which is reflective and has approximately the form of an ellipsoid of revolution whose axis of revolution coincides with the axis of the ring $a$. The lower side of the ring $a$ is covered by means of a metal plate $c$ having an axial tube $d$. The holder $e$ for a glow-lamp $f$ is so clamped in the tube $d$ that the incandescent filament lies approximately at the one focus of the ellipsoidal surface $b$. Against the upper aperture of the ring $a$ lies a glass plate $g$. The central part $h$ of the exterior surface of this glass plate $g$ is plane, and the marginal part $i$ is so ground as to represent the convex surface of part of a cone. The glass plate $g$ is fitted into the ring $a$ in such a manner that the plane central surface $h$ lies below the point of convergence $l$ of the rays at a distance equal to the thickness of one of the usual objective carriers $k$, the said point $l$ representing the other focus of the ellipsoidal surface $b$. To the lower surface of the glass plate $g$ is cemented a plano-convex lens $m$ the convex part $n$ of which is a spherical surface having the point $l$ at its centre. That part of the surface $n$ which is not traversed by the reflected light rays is covered by a layer of varnish $o$ that stops down the direct rays of the glow lamp $f$.

When in use, the dark-field condenser is so placed on the stage of a microscope that the tube $d$ extends into the illumination aperture provided in the usual microscope stages and that the axis of revolution of the reflecting surface $b$ coincides with the optical axis of the microscope objective. Those light rays emitted by the glowlamp $f$ which strike the interior surface $b$ of the ring $a$ are converged by this surface at the point $l$, and they traverse the spherical surface $n$, the lens $m$ and the plate $g$ without being refracted. The objective carrier $k$ and the object to be examined are to be placed on the surface $h$ subsequently to a layer of immersion liquid having been placed on this surface, which ensures that the illumination rays issuing from the plate $g$ are not refracted when they traverse the object carrier $k$. When different parts of the object are to be examined, the object carrier $k$ may be easily displaced on the surface $h$, and it may be raised without difficulty by lifting its two ends. The direct illumination rays of the source of light are prevented from entering the lens $m$ and the object by a layer of varnish $o$ representing a diaphragm.

We claim:

1. A dark-field condenser for microscopes, having only one reflecting surface, the said condenser comprising an annular metal reflector, the inner surface of this annular reflector being the said reflecting surface and having at least approximately the form of an ellipsoid of revolution, a light source coinciding with the one focus of the reflecting surface, a transparent plate lying against the said annular reflector and covering the one side of the intermediate space included by the reflecting surface, the other focus of the reflecting surface lying near the exterior surface of the said plate, this plate being adapted to receive in the said other focus the object to be illuminated, so that light emanating from the first said focus of the said reflecting surface is concentrated on this object, and a stop preventing direct light rays from reaching the said other focus.

2. A dark-field condenser for microscopes, having only one reflecting surface, the said condenser comprising an annular metal reflector, the inner surface of this annular reflector being the said reflecting surface and having at least approximately the form of an ellipsoid of revolution, a light source coinciding with the one focus of the reflecting surface, a transparent plate lying against the said annular reflector and covering the one side of the intermediate space included by the reflecting surface, the other focus of the reflecting surface lying near the exterior surface of the said plate, this plate being adapted to receive in the said other focus the object to be illuminated, so that light emanating from the first said focus of the said reflecting surface is concentrated on this object, a plano-convex lens attached to the interior side of the said plate, the centre of the convex surface of the said lens coinciding approximately with the said other focus, and an opaque layer attached to the said lens and preventing direct light rays from reaching the said other focus.

PAUL KRAFT.
RUDOLF STRAUBEL.